United States Patent
Patberg et al.

(10) Patent No.: US 10,357,902 B2
(45) Date of Patent: Jul. 23, 2019

(54) METHOD FOR PRODUCING A COMPONENT FROM ORGANIC SHEETS

(71) Applicant: THYSSENKRUPP STEEL EUROPE AG, Duisburg (DE)

(72) Inventors: Lothar Patberg, Moers (DE); Stefan Mayer, Schwerte (DE); Torsten Krahnert, Fritzlar (DE); Werner Hufenbach, Dresden (DE); Enrico Ladusch, Dresden (DE); Jens Werner, Coswig (DE); André Kießling, Dresden (DE); Alexander Herbig, Dresden (DE); Jörn Kiele, Dresden (DE); Martin Lepper, Dresden (DE)

(73) Assignee: THYSSENKRUPP STEEL EUROPE AG, Duisburg (DE)

( * ) Notice: Subject to any disclaimer, the term of this patent is extended or adjusted under 35 U.S.C. 154(b) by 468 days.

(21) Appl. No.: 14/912,184

(22) PCT Filed: Jul. 28, 2014

(86) PCT No.: PCT/EP2014/066120
§ 371 (c)(1),
(2) Date: Feb. 16, 2016

(87) PCT Pub. No.: WO2015/022174
PCT Pub. Date: Feb. 19, 2015

(65) Prior Publication Data
US 2016/0200014 A1     Jul. 14, 2016

(30) Foreign Application Priority Data

Aug. 16, 2013   (DE) .................. 10 2013 013 497

(51) Int. Cl.
B29C 43/20     (2006.01)
B29C 35/02     (2006.01)
(Continued)

(52) U.S. Cl.
CPC ............ B29C 43/203 (2013.01); B29C 35/02 (2013.01); B29C 35/0261 (2013.01);
(Continued)

(58) Field of Classification Search
CPC ....... B29C 43/203; B29C 35/02; B29C 65/02; B29C 65/0672; B29C 65/4815;
(Continued)

(56) References Cited

U.S. PATENT DOCUMENTS 4,943,404 A * 7/1990 Waldrop ................. B29C 33/12
                                                                      264/257
6,217,000 B1 * 4/2001 Younie .................... B29C 33/38
                                                                      244/123.1
(Continued)

FOREIGN PATENT DOCUMENTS

DE   102008039223 B3   1/2010
DE   102010013131 A1   6/2011
WO   2012152936 A1     11/2012

OTHER PUBLICATIONS

Tyson, Mark, "Robotics 101", ABB Technology Show, May 13, 2013 (Year: 2013).*
(Continued)

*Primary Examiner* — Joseph S Del Sole
*Assistant Examiner* — Lawrence D. Hohenbrink, Jr.
(74) *Attorney, Agent, or Firm* — Lathrop Gage L.L.P.

(57) ABSTRACT

One example method for producing a component from organic sheets may comprise placing a first organic sheet and a second organic sheet next to one another to form a component preform, forming at least one overlapping joining zone by tacking the first and second organic sheets together with a connecting part in the form of a third organic sheet, transferring the component preform to a joining tool, using the joining tool to form a joined component by
(Continued)

Figure 1:
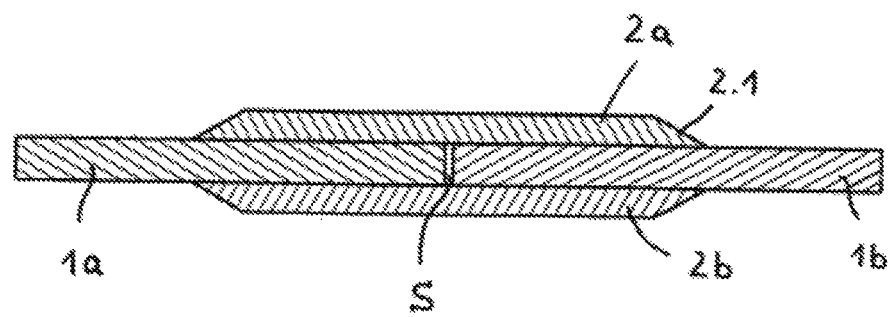

connecting the organic sheets through melting and compression in the overlapping joining zone, and consolidating the joined component at least in the zone of the overlapping joining zone.

15 Claims, 4 Drawing Sheets

(51) Int. Cl.
| | |
|---|---|
| B29C 43/52 | (2006.01) |
| B29C 65/00 | (2006.01) |
| B29C 65/06 | (2006.01) |
| B29C 65/56 | (2006.01) |
| B29C 65/78 | (2006.01) |
| B29C 70/06 | (2006.01) |
| B29C 70/46 | (2006.01) |
| B29C 65/48 | (2006.01) |
| B29C 65/50 | (2006.01) |
| B29C 65/02 | (2006.01) |
| B29C 35/08 | (2006.01) |
| B29K 105/10 | (2006.01) |
| B29K 105/00 | (2006.01) |
| B29L 31/30 | (2006.01) |
| B29C 70/40 | (2006.01) |
| B29C 65/08 | (2006.01) |
| B29C 65/10 | (2006.01) |
| B29C 65/14 | (2006.01) |
| B29C 65/16 | (2006.01) |
| B29C 65/18 | (2006.01) |
| B29C 65/36 | (2006.01) |
| B29C 70/88 | (2006.01) |
| B29C 65/72 | (2006.01) |
| B62D 25/20 | (2006.01) |
| B29K 705/00 | (2006.01) |
| B62D 29/04 | (2006.01) |

(52) U.S. Cl.
CPC ............ *B29C 43/52* (2013.01); *B29C 65/004* (2013.01); *B29C 65/02* (2013.01); *B29C 65/0672* (2013.01); *B29C 65/4815* (2013.01); *B29C 65/5014* (2013.01); *B29C 65/5042* (2013.01); *B29C 65/5071* (2013.01); *B29C 65/56* (2013.01); *B29C 65/7832* (2013.01); *B29C 65/7855* (2013.01); *B29C 66/1142* (2013.01); *B29C 66/1162* (2013.01); *B29C 66/41* (2013.01); *B29C 66/43* (2013.01); *B29C 66/4326* (2013.01); *B29C 66/43421* (2013.01); *B29C 66/721* (2013.01); *B29C 66/73921* (2013.01); *B29C 66/81423* (2013.01); *B29C 66/8242* (2013.01); *B29C 66/83221* (2013.01); *B29C 70/06* (2013.01); *B29C 70/46* (2013.01); *B29C 65/06* (2013.01); *B29C 65/08* (2013.01); *B29C 65/10* (2013.01); *B29C 65/1412* (2013.01); *B29C 65/16* (2013.01); *B29C 65/18* (2013.01); *B29C 65/36* (2013.01); *B29C 65/48* (2013.01); *B29C 65/562* (2013.01); *B29C 65/72* (2013.01); *B29C 65/7841* (2013.01); *B29C 65/7847* (2013.01); *B29C 66/0242* (2013.01); *B29C 66/0342* (2013.01); *B29C 66/1122* (2013.01); *B29C 66/7212* (2013.01); *B29C 66/72141* (2013.01); *B29C 66/72143* (2013.01); *B29C 66/91921* (2013.01); *B29C 66/91935* (2013.01); *B29C 70/40* (2013.01); *B29C 70/885* (2013.01); *B29C 2035/0811* (2013.01); *B29C 2035/0822* (2013.01); *B29C 2043/525* (2013.01); *B29K 2105/10* (2013.01); *B29K 2105/256* (2013.01); *B29K 2705/00* (2013.01); *B29L 2031/3005* (2013.01); *B29L 2031/3055* (2013.01); *B62D 25/20* (2013.01); *B62D 29/043* (2013.01)

(58) Field of Classification Search
CPC . B29C 65/5014; B29C 65/5042; B29C 65/56; B29C 65/7832; B29C 66/1142; B29C 66/1162; B29C 66/41; B29C 66/43; B29C 66/43421; B29C 66/721; B29C 66/73921; B29C 70/06; B29C 70/46; B29C 70/40
USPC ..... 264/445, 544, 171.16, 171.17, 248, 259, 264/263
See application file for complete search history.

(56) References Cited

U.S. PATENT DOCUMENTS

| | | | |
|---|---|---|---|
| 6,284,089 B1* | 9/2001 | Anderson | B29C 65/5042 156/304.3 |
| 8,790,487 B2* | 7/2014 | Weimer | B29C 70/34 156/245 |
| 2012/0269999 A1* | 10/2012 | Kind | B29C 31/085 428/34.1 |
| 2013/0149491 A1 | 6/2013 | Wakeman et al. | |
| 2013/0149501 A1 | 6/2013 | Pacchione et al. | |
| 2013/0306233 A1* | 11/2013 | Pini | B29B 11/16 156/256 |

OTHER PUBLICATIONS

English language Abstract for DE 102008039223 B3 listed above.
Int'l Search Report for PCT/EP2014/066120 dated Oct. 27, 2014 (mailed Nov. 5, 2014).

* cited by examiner

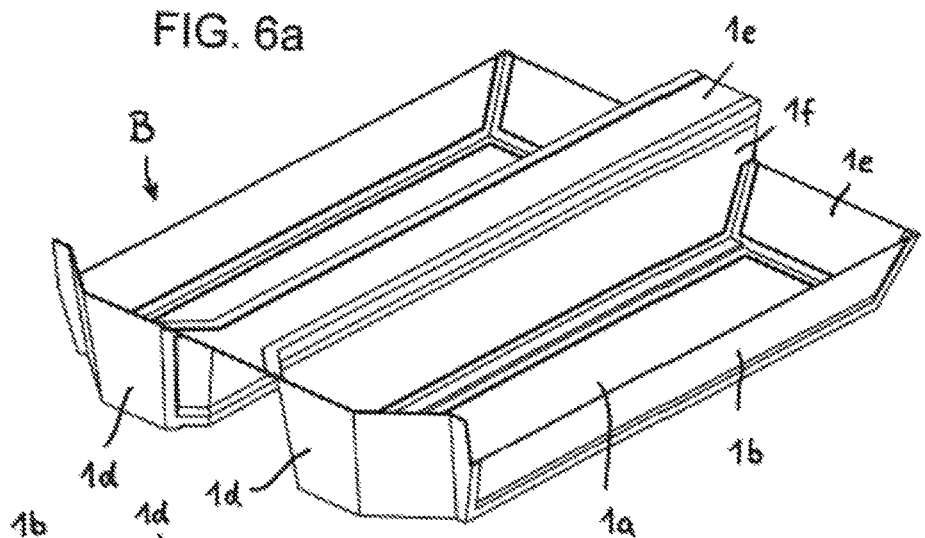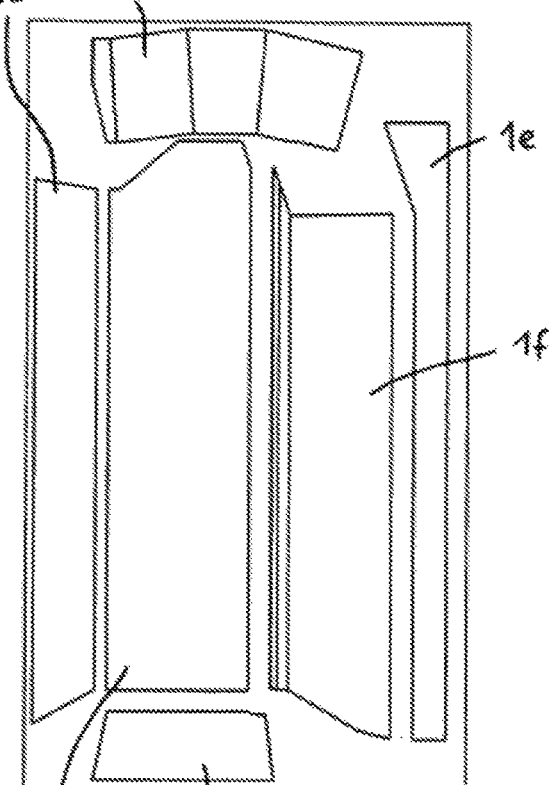

METHOD FOR PRODUCING A COMPONENT FROM ORGANIC SHEETS

Organic sheets are flat semifinished products made from fiber composite material. They have a thermoplastic matrix, into which one or more fiber fabrics and/or one or more laid fiber fabrics are/is introduced. The fibers which are used to produce organic sheets are typically glass, aramid and carbon fibers which are introduced as endless fibers or long fibers into the thermoplastic matrix. Here, the fiber length of the long fibers lies in the range from 1 to 50 mm, whereas fibers which are longer and 50 mm are called endless fibers. In comparison with organic sheets with relatively short fibers, organic sheets with endless fibers have the highest rigidity and strength values.

The fibers of the fiber fabrics and laid fiber fabrics which are embedded into the thermoplastic matrix can also run transversely, for example substantially at right angles with respect to one another, with the result that the rigidity and the strength of organic sheet can be set to be even higher than in the case of many metallic flat products. Organic sheets have excellent lightweight construction properties and are therefore used increasingly in automotive and aircraft construction, in particular in electric vehicle construction.

In order to reshape organic sheet, at least partial, that is to say at least local initial melting (melting) of the thermoplastic matrix is required. There is the problem here, however, that the fibers, in particular if they are endless fibers, considerably impede the deformability of organic sheet on account of their low percent elongation at failure. Fiber fractures and therefore damage to the component to be produced can thus already occur at a low degree of deformation. Incisions are therefore usually provided in the organic sheet to be reshaped or the component preform to be reshaped, in order to make sliding of the organic sheet possible during the reshaping. This results, however, in material weakening which can be reduced, for example, by way of the introduction of additional blanks, that is to say by way of layering of a plurality of different blanks. As an alternative to this measure, the future component can be assembled from a plurality of geometrically simple individual parts by way of the latter being adhesively bonded to one another. This alternative procedure requires additional working steps, however, such as preparation of the surfaces of the joining zones, the application of adhesive, fixing of the individual parts to one another and consolidation (curing) of the adhesive.

Proceeding herefrom, the invention was based on the object of specifying a method of the type mentioned at the outset, by means of which method relatively large components of three-dimensional configuration and made from organic sheet can be produced economically with high, preferably very high rigidity and strength values.

This object is achieved by way of a method having the features which are specified in claim 1. Preferred and advantageous refinements of the method according to the invention are specified in the sub claims.

The method according to the invention is distinguished by the following method steps:
placing at least two organic sheets against one another to form a component preform,
forming at least one overlapping joining zone, in which the organic sheets which are placed against one another are tacked to one another using at least one connecting part which is configured as an organic sheet,
transferring the component preform which is formed from the organic sheets which are tacked to one another to or into a joining tool,
connecting the organic sheets of the component preform by means of the joining tool by way of at least local melting, and compressing of the joining zone between the organic sheets, and
consolidating the joined component, by at least the joining zone being consolidated.

By way of the solution according to the invention, relatively large components of three-dimensional configuration made from organic sheets can be produced economically with high and very high rigidity and strength values.

In the case of a component which is produced according to the invention, although the fiber arrangement, that is to say the fiber course, is interrupted in the joining zones, as a result of the force redistribution into the fiber structure of the respective connecting element which is configured as an organic sheet and is configured, for example, in the shape of a strap or angled profile, a significantly higher load-bearing capability is achieved. The edges of the connecting element, in particular its longitudinal edges, are preferably chamfered, with the result that the connecting elements which are in the shape of a strap or flat bar have a trapezoidal cross-sectional profile, the wider face of the profile being used as joining face.

According to the invention, the component is therefore assembled from individual plate-shaped organic sheets which are not curved or are curved only slightly and are first of all tacked to one another locally using at least one connecting element which is arranged in an overlapping manner and is configured as an organic sheet. To this end, the elements (organic sheets) to be connected are preferably heated locally and are connected (tacked) locally by means of a force to be applied. This process step can take place outside the joining tool, by means of which the further at least local initial melting (melting) and compression of the joining zone between the organic sheets is carried out, and therefore contributes to increased productivity. The local heating for tacking the organic sheets to one another is preferably carried out by way of local welding by means of rotary friction, contact, ultrasonic or laser welding. A reliable partial connection (tacked connection) is achieved, in particular, when, according to a further refinement of the invention, before and/or while the organic sheets are tacked to one another, they are heated to a temperature below or above their melting point.

As an alternative or in addition, the tacking of the organic sheets to one another can also take place using mechanical connecting means, for example metallic clips. A sufficiently inherently stable component preform is produced in each case which can already be transferred.

After the transfer of the component preform into the joining tool or to the latter, the actual connection of the organic sheets takes place by means of the joining tool by way of at least local melting and compression of the joining zone between the organic sheets. Here, the melting of the organic sheets in the joining zone in order to connect the organic sheets of the component preform is carried out, for example, by way of the application of a hot air jet, of ultrasonic welding, of an infrared radiant heater, of an inductive heating apparatus or of a contact heater. In a further refinement of the invention, the joining force for compressing the joining zone is preferably applied by means of a pressing tool which is part of a hydraulic pressing system, a robot or an apparatus which is actuated by way of hydraulic cylinders for local compression.

The consolidation of the joined component or the joining zone takes place in the joining tool or pressing tool. For consolidation, the joined component or the joining zone is cooled to a temperature below the melting point or recrystallization temperature of the organic sheets.

In the method according to the invention, in order to achieve a lightweight, three-dimensionally shaped component with very high rigidity and strength, organic sheets are preferably used, the thermoplastic matrix of which contains endless fibers. As an alternative or in addition, however, organic sheets can also be used, the thermoplastic matrix of which contains long fibers.

Another advantageous refinement of the method according to the invention is distinguished by the fact that the joining zone or at least one of the joining zones is provided on both sides with connecting parts which are configured as an organic sheet. In this way, a particularly high load-bearing capability can be achieved in the region of the relevant joining zone by way of force redistribution into the fiber structure of the two connecting parts which are configured, for example, in the shape of a strap or preferably an angled profile. The fiber-reinforced thermoplastic connecting parts can have different strap or web thicknesses, in order to adapt the component to be produced in an optimum manner in the sense of lightweight construction to the material loading which is to be expected during subsequent use. As an alternative or in addition, the two fiber-reinforced connecting parts can have different fiber orientations, fiber lengths and/or fiber contents to this end.

A further advantageous refinement of the invention provides that, before and/or while the organic sheets are tacked to one another, reinforcing material is introduced into the joining zone and/or is applied to at least one of the organic sheets. The load-bearing capability in the region of the relevant joining zone can also be improved as a result of this. Here, for example, at least one metal sheet, preferably a perforated metal sheet, at least one profile made from metallic or fiber-reinforced material, at least one thermoplastic molding compound reinforced by long fibers and/or at least one blank made from fiber-reinforced thermoplastic are/is used as reinforcing material.

With regard to a high degree of automation and high productivity, it is favorable if, according to a further advantageous refinement of the invention, the tacking of the organic sheets to one another is carried out using a transfer apparatus which receives the organic sheets which are to be set against one another to form the component preform, by means of grippers, preferably needle and/or suction grippers.

The initial melting (melting) of the organic sheets for the additional, actual connection thereof can also be carried out according to the invention in such a way that the component preform is melted in its entirety. This is expedient, in particular, when, in one refinement of the invention, the component preform is to be reshaped or is reshaped at least partially into a different geometric structure during the compression of the joining zone.

The method according to the invention affords the following advantages:

the storage and handling of the organic sheets (organic sheet segments) is uncomplicated;

if organic sheet segments which are reinforced by endless fibers are used, complex three-dimensional component geometries with high and very high rigidity and strength values can be realized;

the use of expensive adhesive can be dispensed with;

the consolidation in a single process step reduces the reworking outlay in comparison with the adhesive bonding of a plurality of organic sheet segments;

a high degree of automation can be achieved in the implementation of the method according to the invention;

the connecting part or parts which is/are configured as an organic sheet can be produced continuously and relatively inexpensively in the form of a flat or angled profile in an extrusion process;

here, different strip or profile cross sections can be produced in the same extrusion die by way of the exchange of comparatively inexpensive molds;

three-dimensional component geometries can be produced substantially without waste using simple, in particular flat organic sheet segments;

since the joining of the organic sheets and the connecting parts which are configured as an organic sheet takes place only locally, force and thermal energy also has to be applied only there. This results in a more efficient process in energy terms than, for example, in the case of pressing and reshaping a single-piece, large-area organic sheet. Furthermore, simpler, lighter and therefore less expensive tools or holding systems can therefore also be used than in the case of reshaping of a single-piece, large-area organic sheet by means of correspondingly large and heavy pressing tools;

an organic sheet with a desired, in particular different fiber orientation and/or different thickness can be used for each part area of the component to be produced, whereas this is scarcely possible during the reshaping of a single-piece (monolithic) organic sheet with a predefined fiber orientation;

undercut component geometries can also be manufactured by way of relatively simply designed holding systems, which, in the case of reshaping of a monolithic organic sheet in a pressing process, cannot be realized or can be realized only with high technical outlay.

Figure 3:
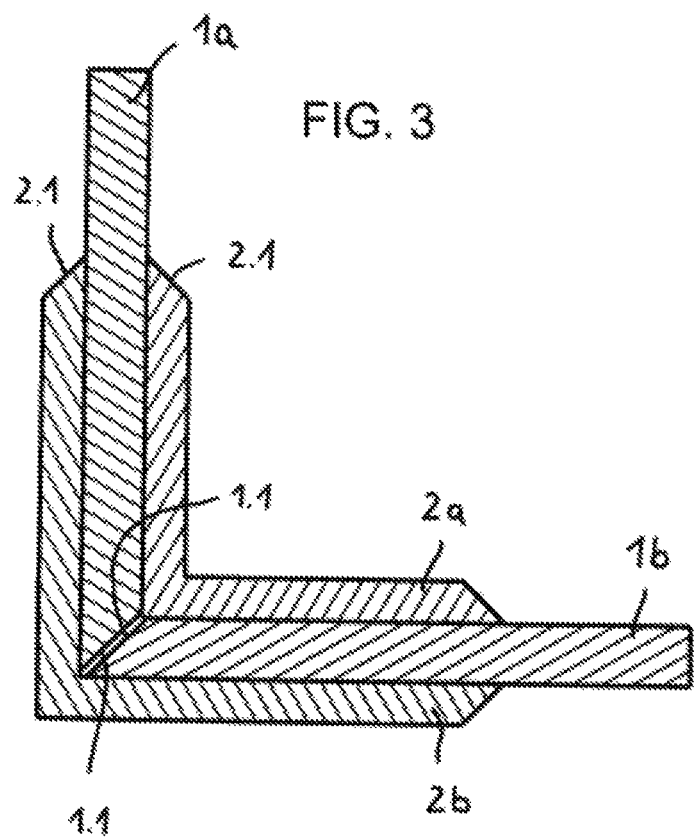
Figure 4:
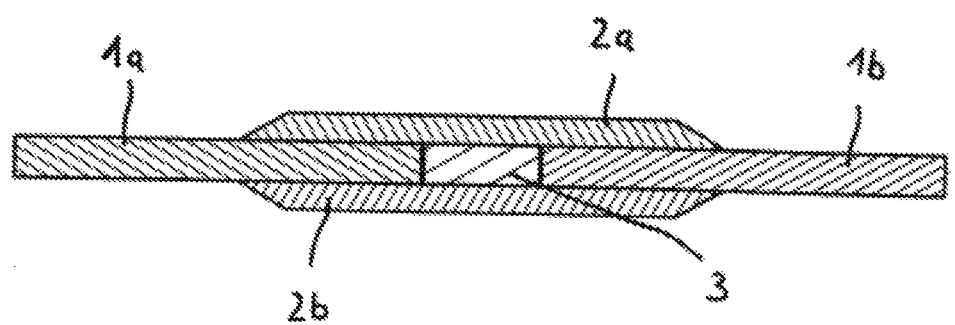
Figure 5A:
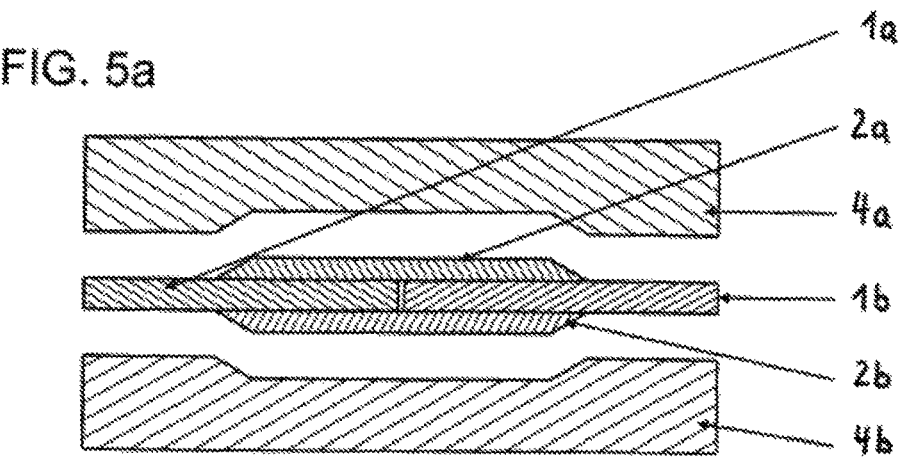
Figure 5B:
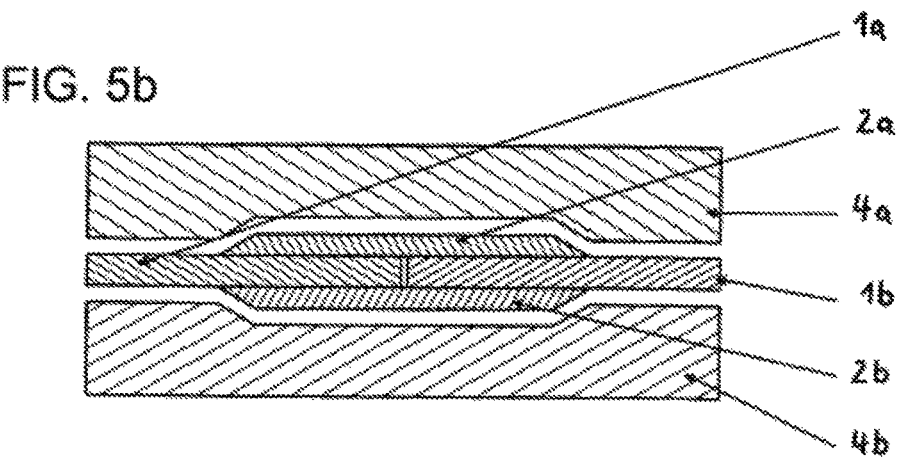
Figure 5C:
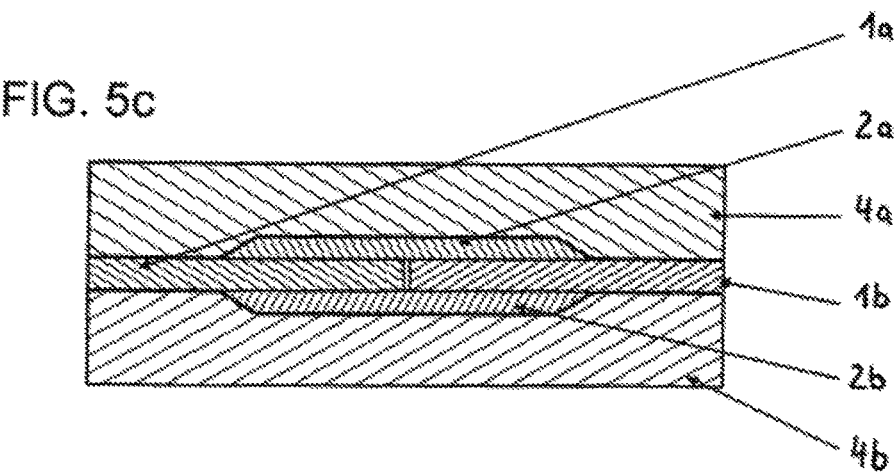

In the following text, the invention will be explained in greater detail using a drawing which shows a plurality of exemplary embodiments and in which, diagrammatically:

FIGS. 1 to 4 show different exemplary embodiments of organic sheets which are connected to one another according to the invention, in a sectional view, FIGS. 5a to 5c show a pressing apparatus for initial melting (melting) and compression of organic sheets which are tacked to one another using connecting strips, in a sectional view, and FIGS. 6a and 6b show a component which is produced according to the invention with three-dimensional geometry in a perspective illustration, and organic sheet segments, from which a component of this type is assembled, in plan view.

The exemplary embodiments which are shown in FIGS. 1 to 4 are based on a flexurally stressed bracket arm which is assembled from two plate-shaped organic sheet segments 1a, 1b. The two organic sheet segments 1a, 1b are connected to one another by way of connecting elements 2a, 2b in the shape of straps or angled profiles which likewise consist of organic sheet. On account of the thermoplastic fiber composite material of the connecting strips 2a, 2b, different mechanical properties in the tensile and compression direction arise. The connecting strips 2a, 2b preferably have chamfered longitudinal edges 2.1 and a trapezoidal cross-sectional profile, the wider face of the profile serving as joining face. The organic sheet segments 1a, 1b can have substantially identical properties or can differ from one another with regard to their thickness, fiber orientation, fiber length and/or their fiber content.

In the exemplary embodiment according to FIG. 1, plate-shaped organic sheet segments 1a, 1b are set against one another along their abutting edges and are connected to one another in an integrally joined manner by way of two connecting strips 2a, 2b which are manufactured from organic sheet, are arranged on both sides of the joint gap S and overlap the organic sheet segments 1a, 1b. In this case, the connecting strips 2a, 2b have the same thickness. They are arranged substantially symmetrically with respect to the joint gap S.

Figure 2:
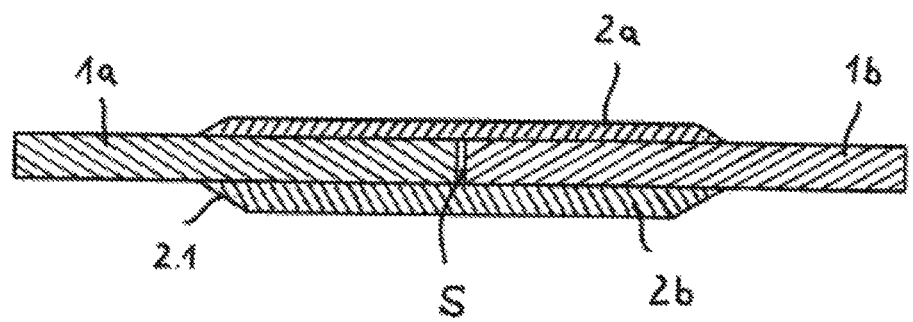

The exemplary embodiment which is shown in FIG. 2 differs from the example according to FIG. 1 in that the strap-shaped connecting strips 2a, 2b of the plate-shaped organic sheet segments 1a, 1b have different thicknesses. In addition, the fiber-reinforced connecting strips 2a, 2b can also differ from one another with regard to their fiber orientation.

In the exemplary embodiment which is shown in FIG. 3, the organic sheet segments 1a, 1b which are to be connected to one another are arranged at an angle with respect to one another. They can enclose a 90° angle, for example. However, the organic sheet segments 1a, 1b can also likewise be arranged with respect to one another in such a way that they enclose an obtuse or acute angle. Here, those edges 1.1 of the organic sheet segments 1a, 1b which face one another are preferably correspondingly chamfered. For example, they have a chamfer of approximately 45° if the organic sheet segments are arranged at an angle of approximately 90° with respect to one another. The connecting elements 2a, 2b which likewise consist of thermoplastic fiber composite material (organic sheet) are configured as angled profiles which define a corresponding angle.

The production of the strap-shaped or angle-shaped connecting elements 2a, 2b preferably takes place by way of extrusion (continuous casting). Here, connecting elements 2a, 2b with different cross-sectional shapes can be produced in the same extrusion die by way of the exchange of corresponding molds.

The exemplary embodiment which is shown in FIG. 4 differs from the exemplary embodiments of FIGS. 1 to 3 in that a metallic insert part 3, in particular a steel or light-weight metal profile is integrated into the connecting region of the organic sheet segments 1a, 1b. The insert part 3 can serve, for example, as a reinforcing element or for the attachment of functional elements to the component.

In a modification of the exemplary embodiments which are shown in FIGS. 1 to 4, it also lies within the scope of the invention to attach a connecting strip 2a or 2b in the shape of a strip or angled profile merely on one side of the organic sheet segments 1a, 1b to be connected.

The integrally joined connection of the organic sheet segments 1a, 1b to the connecting strips 2a, 2b in the shape of straps or angled profiles takes place in at least two steps. First of all, the organic sheet segments 1a, 1b which are set against one another are connected partially by way of tacking to the connecting strip or strips 2a, 2b which is/are arranged in an overlapping manner, such that a substantially inherently stable component preform results. The tacking preferably takes place by way of local welding, for example by way of local ultrasonic, rotary friction, laser or contact welding. The component preform is then transferred to or into a joining tool, by means of which the organic sheet segments 1a, 1b are connected to one another in an integrating and therefore final manner by way of at least local melting (initial melting) and compression of the joining zones between said organic sheet segments 1a, 1b.

FIGS. 5a to 5c show the principal construction of a joining apparatus for partially melting and compressing a joining zone of organic sheet segments 1a, 1b which are tacked on connecting strips 2a, 2b. The joining apparatus has a pressing tool which is constructed from a top tool 4a and a bottom tool 4b. The top tool 4a and the bottom tool 4b can be moved relative to one another and can be raised and lowered by means of hydraulic cylinders (not shown). An apparatus (not shown) for melting the joining zone is integrated into the pressing tool. As an alternative, the apparatus for melting the joining zone can also be arranged in front of the pressing tool. The melting (initial melting) of the organic sheets 1a, 1b, 2a, 2b in the joining zone takes place, for example, by means of hot air, ultrasonic welding, infrared radiation, eddy current (induction) or contact heating.

Subsequently, the joined component is consolidated, by at least the melted joining zones being forced cooled. This can take place within the joining apparatus, in particular within the pressing tool 4a, 4b, or outside the latter.

FIGS. 6a and 6b show a component B which is produced according to the invention and individual organic sheet segments 1a, 1b, 1c, 1d, 1e, 1f, from which a component B of this type is assembled. The component B is, for example, a floor assembly of a motor vehicle. The bottom faces 1a, side and inner walls 1b, 1c, 1d, 1e and bridge plates if of the component B are removed from stacks which in each case comprise a multiplicity of corresponding organic sheet individual parts, and are positioned with respect to one another on a holding apparatus (not shown). In the following method step, flat and angular connecting strips 2a, 2b made from organic sheet are positioned over the butt joints of the individual parts which are set against one another to form a component preform, and are tacked on the individual parts 1a to 1f by means of a mobile tacking tool (not shown). To this end, the tacking tool is provided, for example, with an ultrasonic welding head or another suitable means for local melting (tacking) of the organic sheet segments 1a to 1f and organic sheet connecting strips 2a, 2b. After cooling of the local, relatively small joins, integrally joined connecting points are produced which impart a sufficient inherent stability to the component preform, with the result that it can be transferred into a joining or pressing tool. Integrating and therefore completing integral joining of the organic sheet segments 1a to 1f and connecting strips 2a, 2b takes place there by way of at least local melting and subsequent consolidation.

The implementation of the invention is not restricted to the exemplary embodiments which are shown in the drawing. Rather, further variants are conceivable which make use of the invention which is specified in the appended claims, even in the case of a design which differs from the exemplary embodiments. For example, it lies within the scope of the invention to combine the features of the various exemplary embodiments shown in the drawing among one another.

The invention claimed is:

1. A method for producing a component from organic sheets, the method comprising:
   positioning a first organic sheet and a second organic sheet adjacent to or against one another to form a component preform, wherein the first and the second organic sheet define organic sheet segments which are set against one another along their abutting edges, wherein the abutting edges define a joint gap;

forming at least one overlapping joining zone in which the first and second organic sheets are tacked to one another with at least one connecting part that is configured as a third organic sheet, wherein the third organic sheet defines a connecting strip in the shape of a strip or an angled profile which is arranged on one side of the joint gap and overlaps the organic sheet segments, wherein the first and second organic sheets are tacked to one another by a transfer apparatus that receives the first, second, and third organic sheets by way of at least one of needle grippers or suction grippers;

transferring the component preform to a joining tool;

using the joining tool to form a joined component by connecting the first and second organic sheets of the component preform by way of at least local melting and compression in the at least one overlapping joining zone between the first, second, and third organic sheets in a way that at least partially reshapes the component preform; and consolidating the at least one overlapping joining zone of the joined component.

2. The method of claim 1 wherein the first and second organic sheets comprise a thermoplastic matrix having endless fibers or long fibers.

3. The method of claim 1 wherein the at least one overlapping joining zone comprises a first joining zone and a second joining zone, the method further comprising:

joining the first, second, and third organic sheets at the first joining zone; and joining the first organic sheet, the second organic sheet, and a fourth organic sheet at the second joining zone.

4. The method of claim 1 wherein tacking the first and second organic sheets to one another comprises locally welding by at least one of rotary friction welding, contact welding, ultrasonic welding, or laser welding.

5. The method of claim 1 wherein tacking the first and second organic sheets to one another comprises using metallic clips.

6. The method of claim 1 further comprising at least one of:

introducing reinforcing material into the at least one overlapping joining zone; or applying the reinforcing material to at least one of the first, second, or third organic sheets.

7. The method of claim 6 wherein the reinforcing material is at least one of a perforated metal sheet, one or more profiles comprising metallic or fiber-reinforced material, one or more thermoplastic molding compounds, or one or more blanks comprising fiber-reinforced plastic.

8. The method of claim 1 further comprising heating the first, second, and third organic sheets to a temperature below their respective melting points.

9. The method of claim 1 further comprising heating the first, second, and third organic sheets to a temperature above their respective melting points.

10. The method of claim 1 wherein the local melting in the at least one overlapping joining zone of the first, second, and third organic sheets results from applying heat from a hot air jet, from ultrasonic welding, from an infrared radiant heater, from an inductive heating apparatus, or from a contact heater.

11. The method of claim 1 wherein the at least local melting in the at least one overlapping joining zone comprises melting the component preform in its entirety.

12. The method of claim 1 wherein the joining tool is a pressing tool that is part of a hydraulic pressing system or part of an apparatus for local compression, wherein the pressing tool is actuated by way of hydraulic cylinders.

13. The method of claim 1 wherein consolidating the at least one overlapping joining zone of the joined component comprises cooling the first, second, and third organic sheets to a temperature below their respective melting points.

14. The method of claim 1 wherein consolidating the at least one overlapping joining zone of the joined component comprises cooling the first, second, and third organic sheets below their respective recrystallization temperatures.

15. A method for producing a component from organic sheets, the method comprising:

positioning a first organic sheet and a second organic sheet next to one another, wherein the first and the second organic sheet define organic sheet segments which are set against one another along their abutting edges, wherein the abutting edges define a joint gap;

using a transfer apparatus to tack the first and second organic sheets to one another in a joining zone with a third organic sheet, wherein the third organic sheet defines a connecting strip in the shape of a strip or an angled profile which is arranged on one side of the joint gap and overlap the organic sheet segments, wherein the transfer apparatus receives the first, second, and third organic sheets by way of at least one of needle grippers or suction grippers;

transferring the first, second, and third organic sheets to a joining tool;

using the joining tool to form a joined component by melting and compressing the first, second, and third organic sheets in the joining zone, wherein the first, second, and third organic sheets are at least partially reshaped as a result of the melting and compressing; and consolidating the first, second, and third organic sheets in the joining zone of the joined component.

* * * * *